Dec. 29, 1925.　　　　　　　　　　　　　　　　1,567,906
R. O. G. BOWMAN
BEE GUM
Filed May 13, 1924　　　2 Sheets-Sheet 1
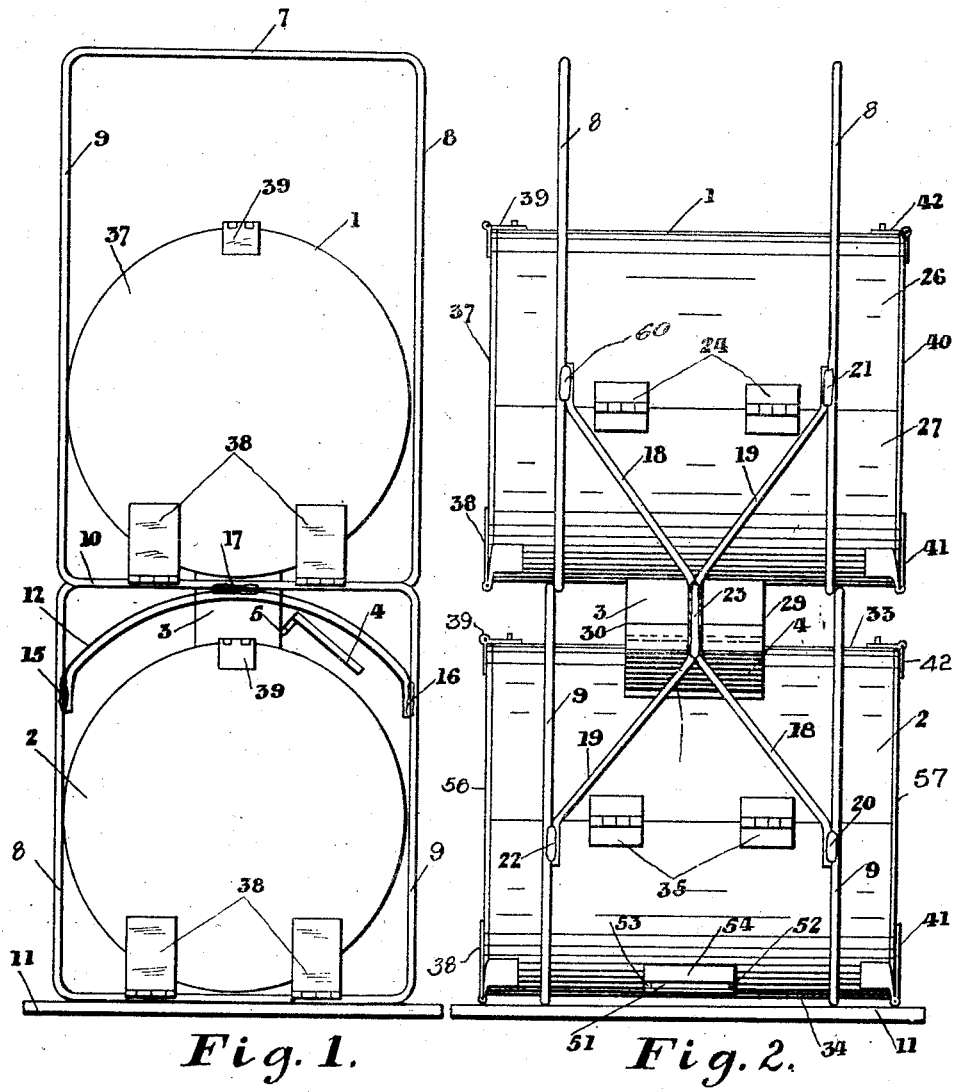
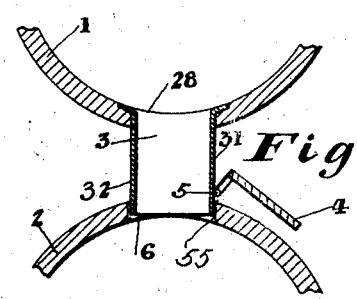
Fig. 1.　　Fig. 2.
Fig. 3.
Inventor
RILLIE O. G. Bowman.
By
Attorney Patented Dec. 29, 1925.

1,567,906

UNITED STATES PATENT OFFICE.

RILLIE O. G. BOWMAN, OF PELAHATCHIE, MISSISSIPPI.

BEE GUM.

Application filed May 13, 1924. Serial No. 713,097.

*To all whom it may concern:*

Be it known that I, RILLIE O. G. BOWMAN, residing in the city of Pelahatchie, county of Rankin, and State of Mississippi, and a citizen of the United States, have invented certain new and useful Improvements in Bee Gums, of which the following is a specification, reference being had to the accompanying drawing, forming a part thereof.

My invention relates to bee gums and has for its object to provide a structure which is exceptionally inexpensive but yet durable in its construction. A further object is to provide a rack or holder constructed of wire and adapted to receive the gum and such a construction as to afford easy access to the gums, to enable a person working around the bees to obtain the honey from the upper gum without disturbing the bees in the lower gum.

The invention also provides a well ventilated device comprising two stories, the upper adapted to hold the frames which contain the honey and the lower compartment adapted to house the bees and their families.

A further object is to provide a structure having a frame made of wire, which is very light in weight and easy to handle and one which takes up considerably less room than the ordinary type of hive. This particular construction of the gums affords a means whereby the bees may be robbed of the honey without disturbing the bee colony in the lower gum.

With the objects indicated above and other objects hereinafter explained in view, my invention consists in the construction and combination of elements hereinafter described and claimed.

Referring to the drawings:

Figure 1 is a front elevation view of the gum.

Figure 2 is a side elevation view of my gum.

Figure 3 is a detail sectional view of the passage chamber showing the arrangement of the cover.

Figure 5:
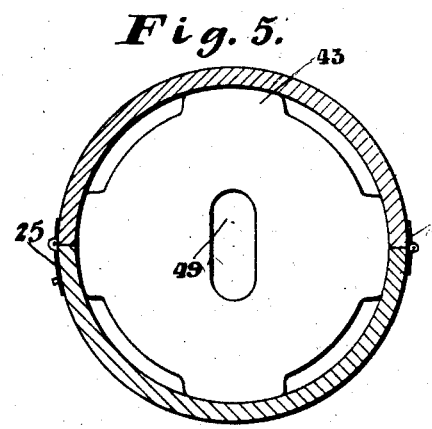
Figure 5 is a sectional view on line 5—5 of Figure 4 showing the forms of the blocks.
Figure 6:
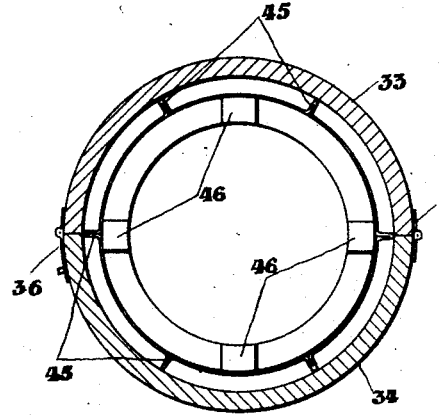
Figure 6 is a sectional view on line 6—6 of Figure 4 showing the forms of the honey frames and the location within the chambers.
Figure 4:
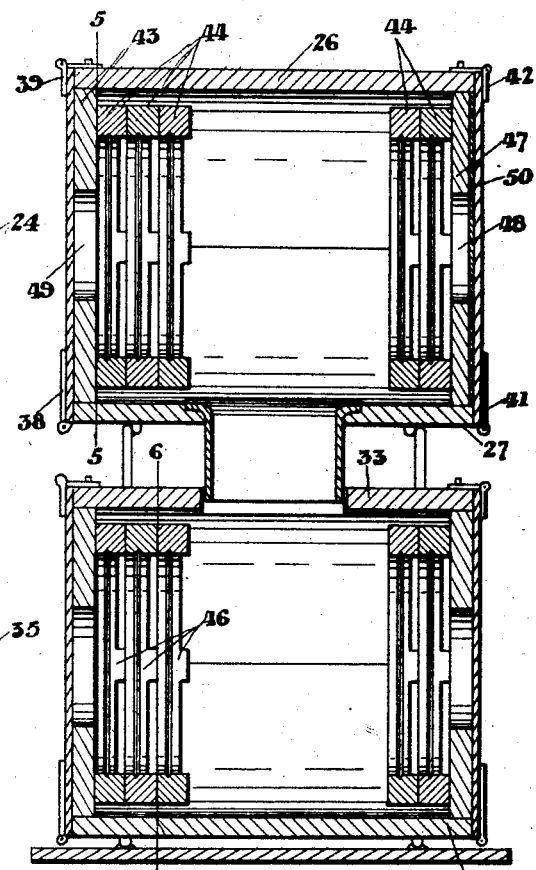
Figure 4 is a side sectional view of the gum showing the inside arrangements of the honey forms and the inner blocks.

In the drawings 1 indicates the upper chamber of the gum and 2 indicates the lower chamber of the gum. 3 indicates the passage between the upper chamber 1 and the lower chamber 2 which enables the bees to pass from one to the other. The cover 4 is hinged or pivoted at 5 and a suitable distance from the lower end 6 of the passage 3 so as to provide said hinged joint outside of the lower chamber 2.

The upper chamber 1 is enclosed or encased in the upper portion of the twisted wire frame. This frame comprises a top wire 7 bent downwardly to form the sides 8 and 9 respectively and then again bent to form bottom wires 10 passing under the upper chamber and forming a rest therefore, and then bent again and extending downwardly to form the sides of the lower portion of the frame.

The lower chamber 2 is also enclosed within the wires 8 and 9 forming the lower portion of the frame, these wires being bent to form a base wire which is rigidly attached to the base 11. These side wires are securely attached to a metal base 11, or of other material, by solder or other means, which forms a support for the bee gum and retains the gum in upright position. A piece of twisted wire 12 is attached to the side wires 8 and 9 of the lower portion of the frame at 15 and 16 respectively, by solder or other means, and passes parallel to the upper circumference of the lower chamber, and is secured at 17 to the twisted wire 10 by solder or other means. This acts as a brace for the frame.

Towards the rear of the chambers 1 and 2 there is placed another twisted wire frame of the same construction. These two frames are placed at suitable distances apart and are braced by tie rods of twisted wire 18 and 19 extending diagonally between the frames. One end of the tie rod 18 is attached to the side 8 of the upper portion of the frame as at 60 and the other side of the tie rod 18 extends diagonally and is attached to the lower end of the opposite frame 9 of the lower portion of the frame as at 20, both of these joints being soldered or otherwise securely fastened. The tie rod 19 is likewise attached to the opposite upper end of the frame 8 of the upper portion of the frame as at 21 and extends downwardly and diagonally to the lower end of the frame 9 of the lower portion of the frame and is securely fastened as at 22 by solder or other means. These two tie rods 18 and 19 are then securely fastened by solder where they pass one another as at 23. The opposite side of the frame is secured in the same way and braced by tie rods in the same manner.

Both the front portion and the rear portion of the frame may be made of one continuous piece of twisted wire or may be made of several pieces and suitably soldered together to form secure joints.

The upper chamber which contains the frames to hold the honey is made of wood and divided horizontally through the center of the gum to form an upper half 26 and a lower half 27. A pair of hinges 24 are provided on one side of the divided chamber and are so placed as to allow the two halves of the chamber to be opened and closed as desired. A locking device 25 is provided on the opposite side of the chamber to insure against the accidental opening of the chamber during the making of the honey.

Midway of the bottom half 27 is provided a hole 28 adapted to receive the passage chamber 3 which provides access for the bees between the upper chamber and the lower chamber. This passage comprises end walls 29 and 30 and side walls 31 and 32 all suitably secured together, the upper ends of which are overturned and securely fastened by solder or other means, over the hole 28. Attached to the side plate 31 at about midway is a pivot 5 having attached thereto a cover 4 which is adapted to be slipped over the lower end of the passage chamber 3 so that the upper chamber containing the honey may be removed without disturbing the bees in the lower chamber.

On the rear of the upper chamber 1 is provided a door 37 having provided at the lower end suitable hinged means and adapted to be swung into open or closed position. A locking means 39 is provided at the upper end to insure the door from opening except when desired.

A door 40 similar to the door 37 is provided at the front end of the upper chamber having suitable hinges 41 at the lower end and provided with a lock 42 to insure the door from becoming accidentally opened.

On the inside of the upper chamber and next to the rear door there is provided a wooden block 43 of circular structure and having an enlarged hole 49 passing entirely therethrough. This block acts as a rear partition to the honey frames. Next to this block are the frames 44, two of which are shown but there may be any suitable number. These frames are circular in structure and of a lesser diameter than the inside diameter of the upper chamber. Between the outside diameter of the frames 44 and the inside diameter of the upper chamber and attached at equal distances apart are lugs 45 which are provided to hold the frames in a centered position. The frames are made of a suitable thickness and are hollowed out to the desired diameter, this hollowed out portion being provided to receive the honey. On the outer side of the frames there are provided lugs 46 of the desired height and spaced equally apart which spacing provides passageways between the several frames so that the bees may have easy access between the frames.

On the opposite end from the block 43 there is provided a block 47 similar to the block 43 and containing a passage way 48 in line with the passage way 49 of the block 43. This permits a free circulation of air through the frames. A covering of cloth or heavy paper 50 is placed over the outside of the block 47 so that the front door of the upper chamber may be left ajar and yet keep out flies or moths or other such insects and thereby allow air into the chamber.

The lower chamber is similarly constructed of wood and divided horizontally through the center of the chamber to form an upper portion 33 and a lower portion 34. The upper portion is provided with an opening 55 adapted to receive the lower end of the passage chamber 3. Hinges 35 are provided to enable the two halves to be readily opened or closed and a lock 36 is provided to insure the two halves from accidently opening. Doors 56 and 57, similar to those numbered 37 and 40, are secured to the respective sides of the lower chamber by hinges 38 and 41 respectively and prevented from disengagement or becoming loosened by the locking means 39 and 42.

At the lower side of the lower half 34 of the lower chamber 2 and about half of the length an opening 51 is provided to enable the bees to pass in and out of the gum. Blocks 52 and 53 are placed on each side of the opening and attached to these blocks across the face of the opening is a strip of wood, metal or cloth 54 which acts as a door to keep out moths, mice, etc. The blocks 52 and 53 are of sufficient height to enable the bees to pass under the strip 54 when it is fastened in place.

The lower chamber 2 likewise contains frames of the same construction as the frames 44 of the upper chamber. This lower chamber however, is merely to house the bee colony in and the upper chamber as a depository for the honey.

While the frame may be made to fit closely around the lower gum, enough room should be allowed above the upper chamber to enable the passage chamber 3 to be withdrawn easily and without difficulty.

It is of extreme importance that these chambers should be constructed in section as it enables the person working with them to have ready access to the inside. It also permits one to keep the insides in absolutely sanitary and clean condition thereby insuring the honey to be in the same condition.

Making the gum of this construction affords an article which is easy to handle, absolutely sanitary and one which may be placed in a convenient place without taking up any excessive amount of room as is necessary with the ordinary bee hive and it is of such a light structure that it can be placed out of the moist and damp places.

While I have specifically described the invention in the foregoing specification, it is to be understood that I do not desire to be limited to this specific construction.

Having thus described my invention what I claim is:—

1. In a bee gum, a base, a front and a rear wire frame consisting of an upper and lower section secured to said base, tie rods connecting said front and rear frame, a cylindrical chamber adapted to fit within the upper section and a similar cylindrical chamber adapted to fit within said lower section, and means of communication between said cylindrical chambers comprising a passage chamber rigidly attached to the chamber of the upper section and adapted to extend into an opening provided in the chamber of the lower section.

2. In a bee gum, the combination of a base, a front and a rear wire frame consisting of an upper and lower section secured to said base, tie rods connecting said front and rear frame, a cylindrical chamber adapted to fit within the upper section and a similar cylindrical chamber adapted to fit within said lower section, and means of communication between said cylindrical chambers comprising a passage chamber rigidly attached to the chamber of the upper section and adapted to extend into an opening provided in the chamber of the lower section, said passage chamber having attached thereto a hinged cover adapted to close over the opening in the end of said chamber when the chamber of the upper section is removed.

In testimony whereof I hereunto affix my signature.

R. O. G. BOWMAN.